March 28, 1961    K. A. RICHARDSON ET AL    2,977,007
APPARATUS FOR DISMANTLING ELECTRIC STORAGE BATTERIES
Filed July 22, 1957    7 Sheets-Sheet 1

Kay A. Richardson
Edward E. Gullette,
                    Inventors.
By Their Attorneys
Harris, Kiech, Foster & Harris.

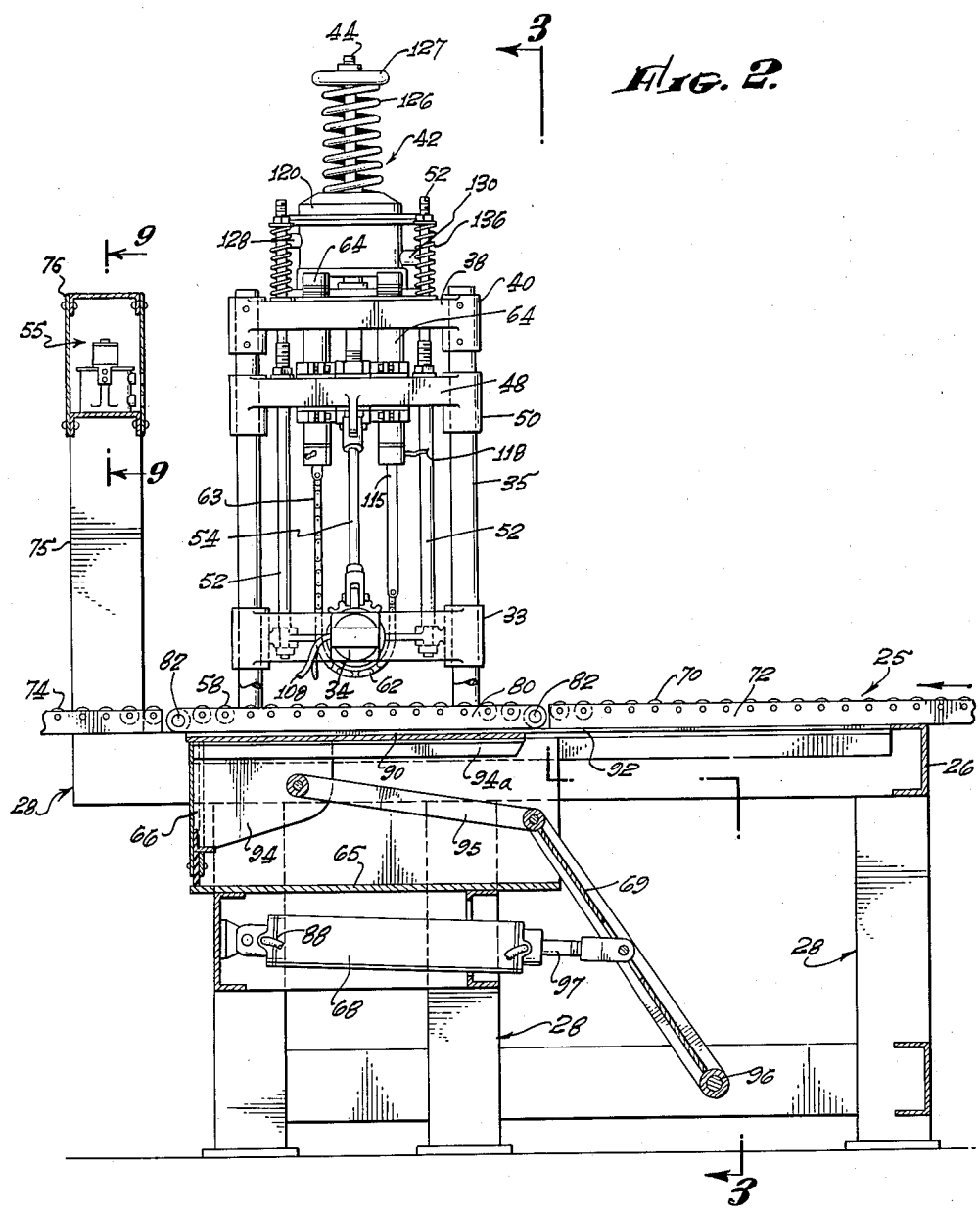

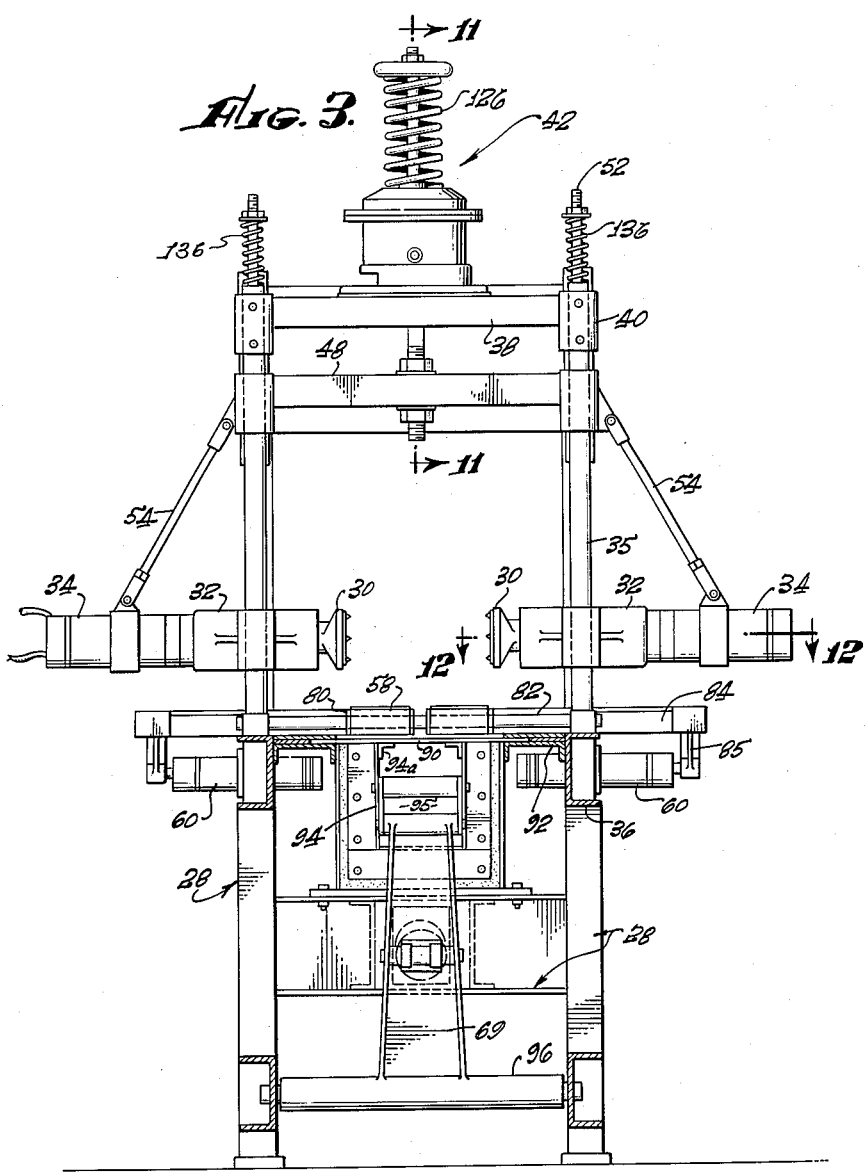

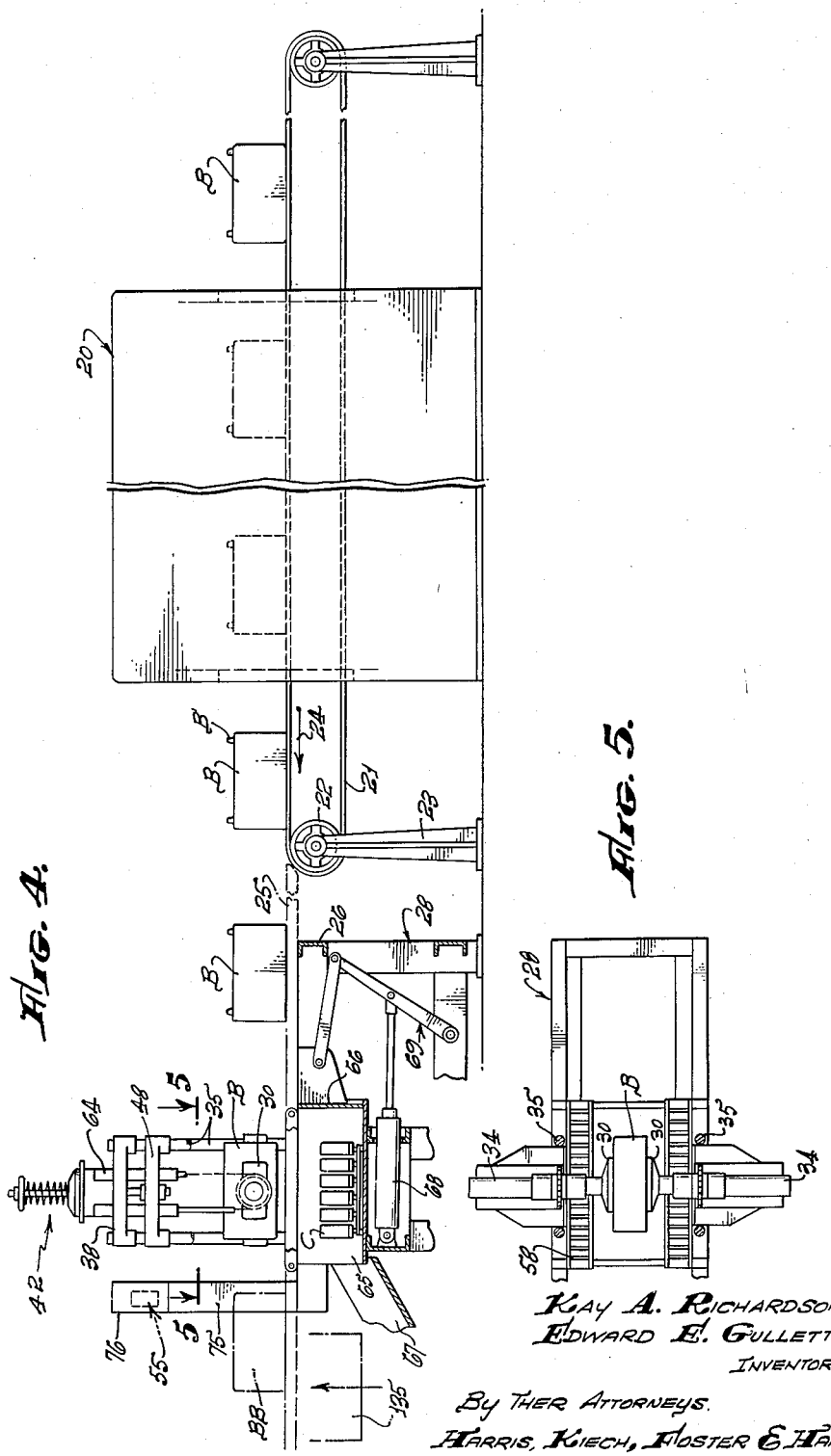

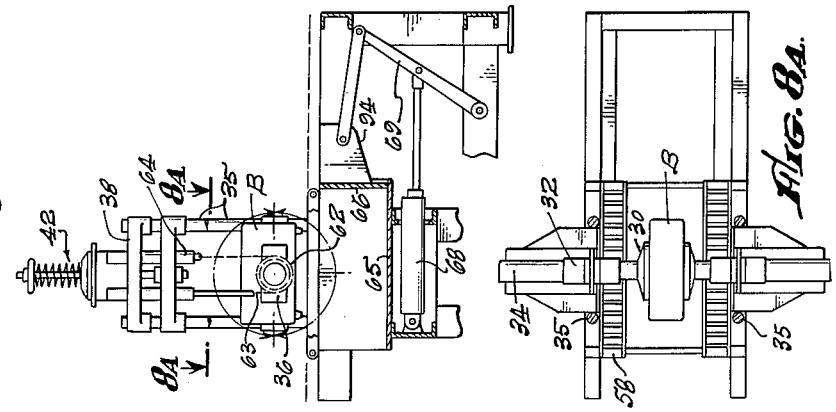
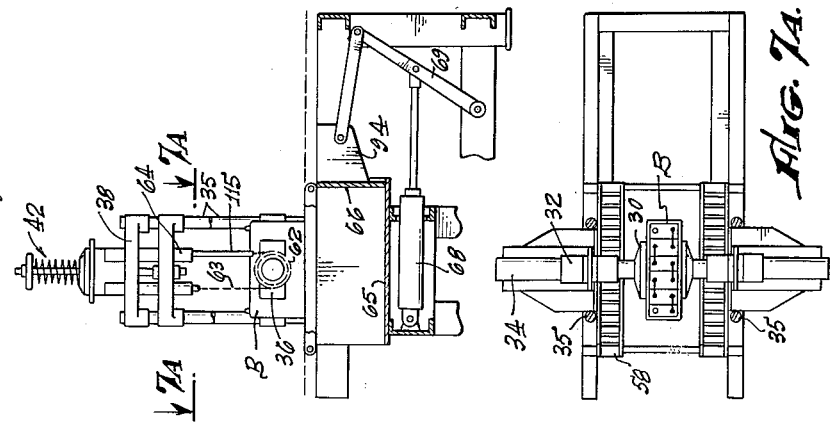
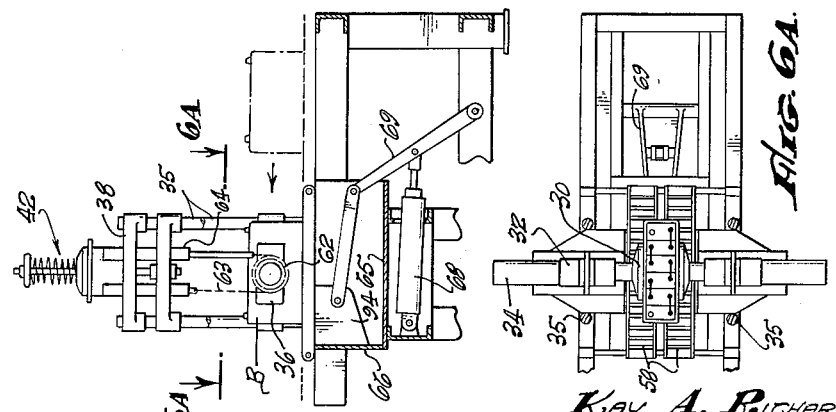

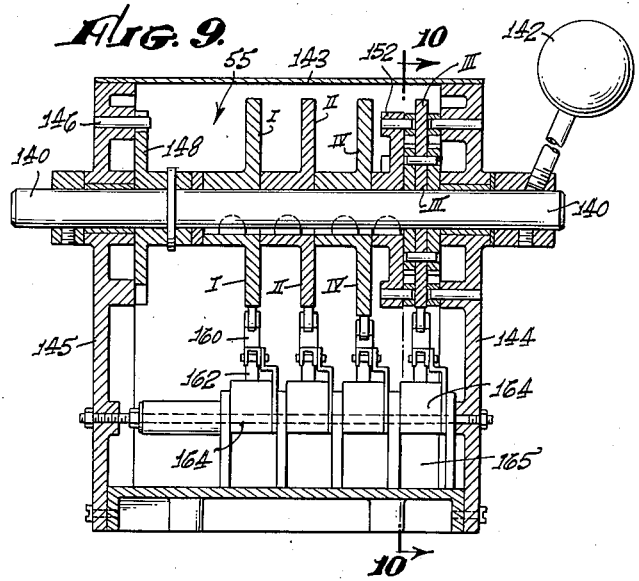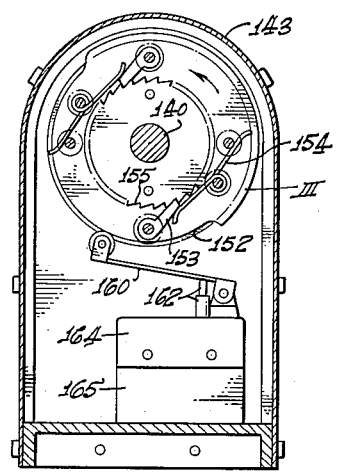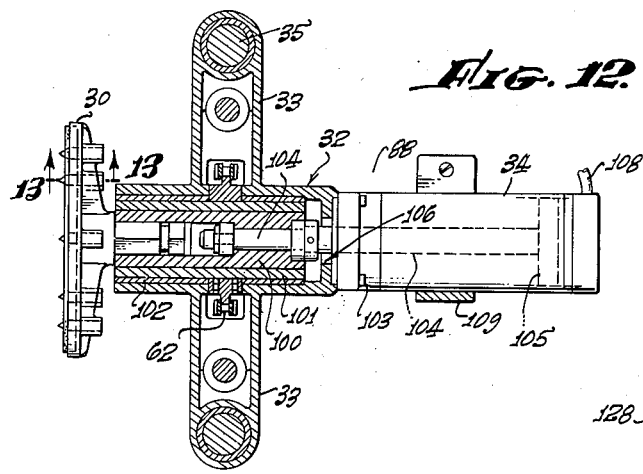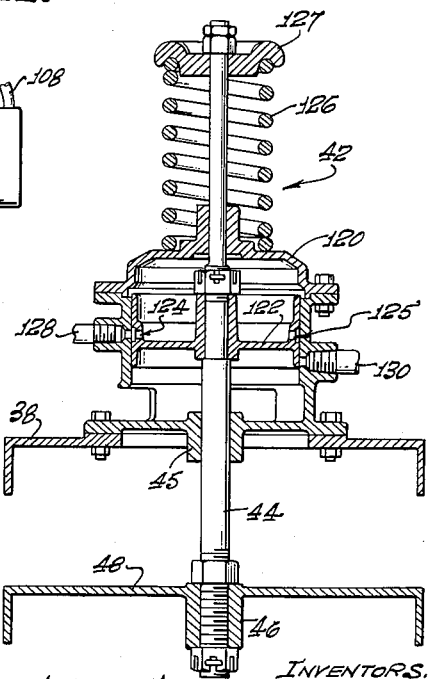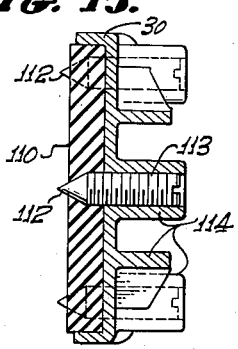

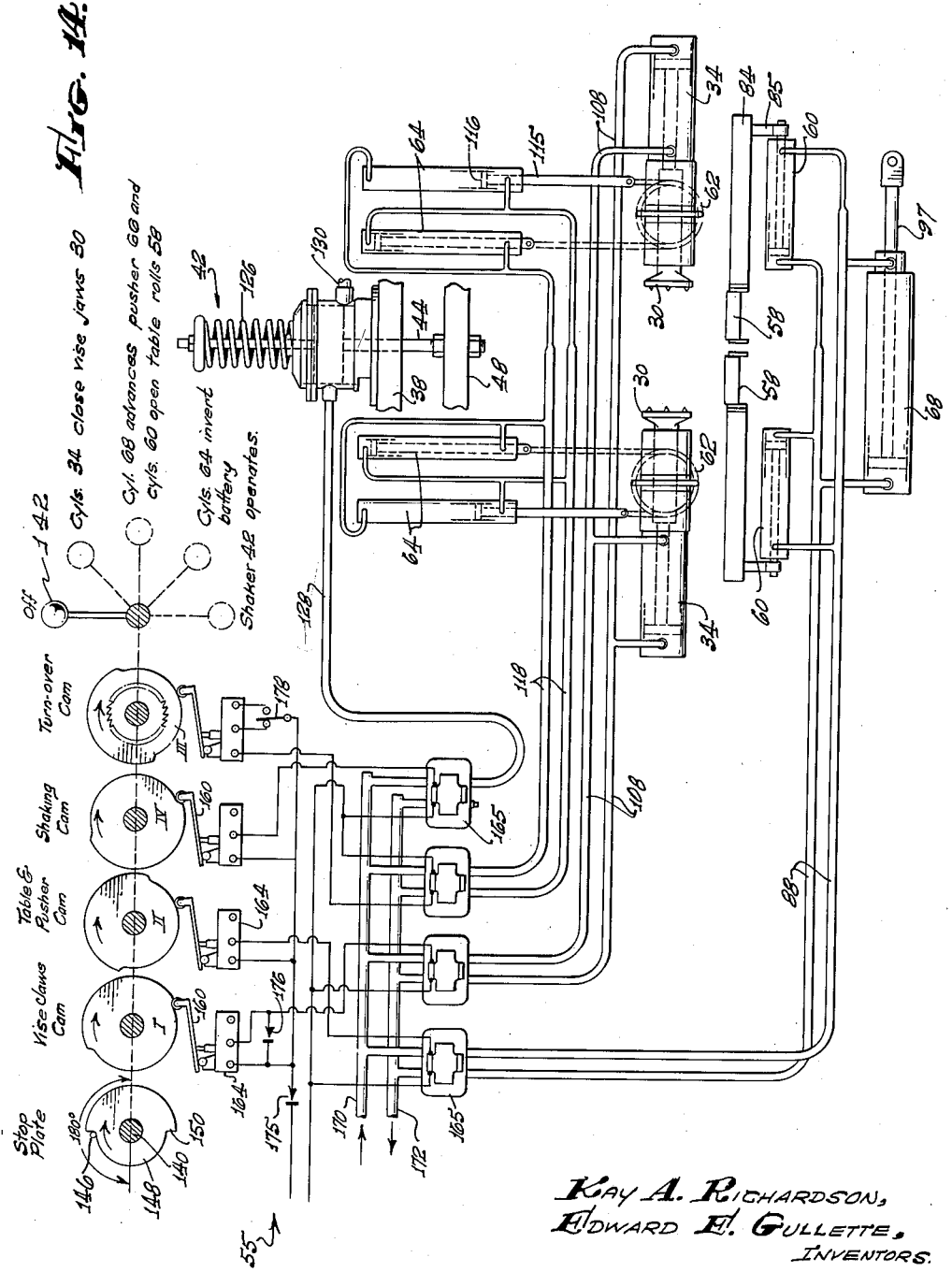

United States Patent Office 2,977,007
Patented Mar. 28, 1961

2,977,007

APPARATUS FOR DISMANTLING ELECTRIC STORAGE BATTERIES

Kay A. Richardson, Bell, and Edward E. Gullette, Inglewood, Calif., assignors to Morris P. Kirk & Son, Inc., Los Angeles, Calif., a corporation of Nevada Filed July 22, 1957, Ser. No. 673,529

15 Claims. (Cl. 214—308)

This invention relates to apparatus for dismantling or wrecking electric storage batteries in order to recover therefrom various constituents, more particularly the lead content of the batteries, for reuse.

An object of the invention is to provide a highly efficient apparatus and method for the handling of old electric storage batteries so that the lead grids and oxides of the various cells may be recovered, along with lead mud commonly found in the bottoms of the battery cases, whereby such lead materials may be smelted and recovered as metallic lead.

A huge number of old electric storage batteries which are no longer useful are discarded annually and therefore require disposition. In handling such batteries, it is important to dispose of the sulfuric acid therein and to separate the lead cell grids, their oxides, and the settled lead mud in the bottoms of the batteries from the conventional insulating battery cases, along with the usual combustible wood or other separators and sealing composition, preparatory to accumulating the lead constituents for smelting. The sulfuric acid must be drained off for separate disposition, and, while the separators, covers and sealing composition will be burned out in smelting, the battery cases are not adaptable to consumption in the smelting operation, and must therefore be removed from the salvaged materials.

It is therefore another object of the invention to provide an apparatus and a method by means of which the acid and lead constituents are easily dislodged from the battery cases and recovered apart from the battery cases.

It is a still further object of the invention to provide vibrating or shaking apparatus by means of which battery cases may be vigorously shaken in inverted position until the contents thereof are dislodged by reason of the shaking operation, and under the influence of gravity until complete dislodgment occurs. It is an incidental object to provide such a means which is effective in almost 100% of the cases.

A more particular object of the invention is to provide heating means to soften the sealing composition at the tops of electric storage batteries, gripping means to engage opposite sides of such batteries, means to rotate such gripping means for inversion of the batteries and reciprocating pneumatic means to shake the batteries, while inverted, until the contents thereof including the acid are dislodged from the battery cases and drop into an underlying receptacle from which the acid and solid constituents may be separately removed.

Thus, a further object of the invention is to dismantle old electric storage batteries by a vibratory shaking operation, the batteries being in inverted position, until the contents thereof are dislodged.

Heretofore various practices have been employed in dismantling old electric storage batteries for recovery of the lead contents. Very characteristically these procedures have involved preliminary drainage of the sulfuric acid, followed by the slamming of the inverted battery down upon a stop means, or the dropping of such an inverted battery from a high point down upon such stop means, to dislodge the battery contents in a one-shot gravity shock step, or by pulling the cells from the battery case by inserting hooks under the cell connecting straps while the case is held captive in an upright position. With the increase in the variety of battery sizes so that a one-stop means accommodates only a small portion of sizes, such devices have become continuously less satisfactory.

It is therefore an additional object of this invention to provide apparatus and procedures which readily handle batteries of all sizes and overcome all of the objections of the prior uses and apparatus, all operations being largely automatic.

Other objects of the invention and various features of construction of a preferred form will be apparent from the following description and the accompanying drawings.

In the drawings:

Fig. 2 is in general a side elevation of the apparatus of Fig. 1, as taken from the line 2—2 of Fig. 1, certain lower portions being in vertical section;

Fig. 3 is principally a front view of the apparatus of Figs. 1 and 2, as indicated by the line 3—3 of Fig. 2, lower portions of the framework being shown in vertical section;

Figure 1:
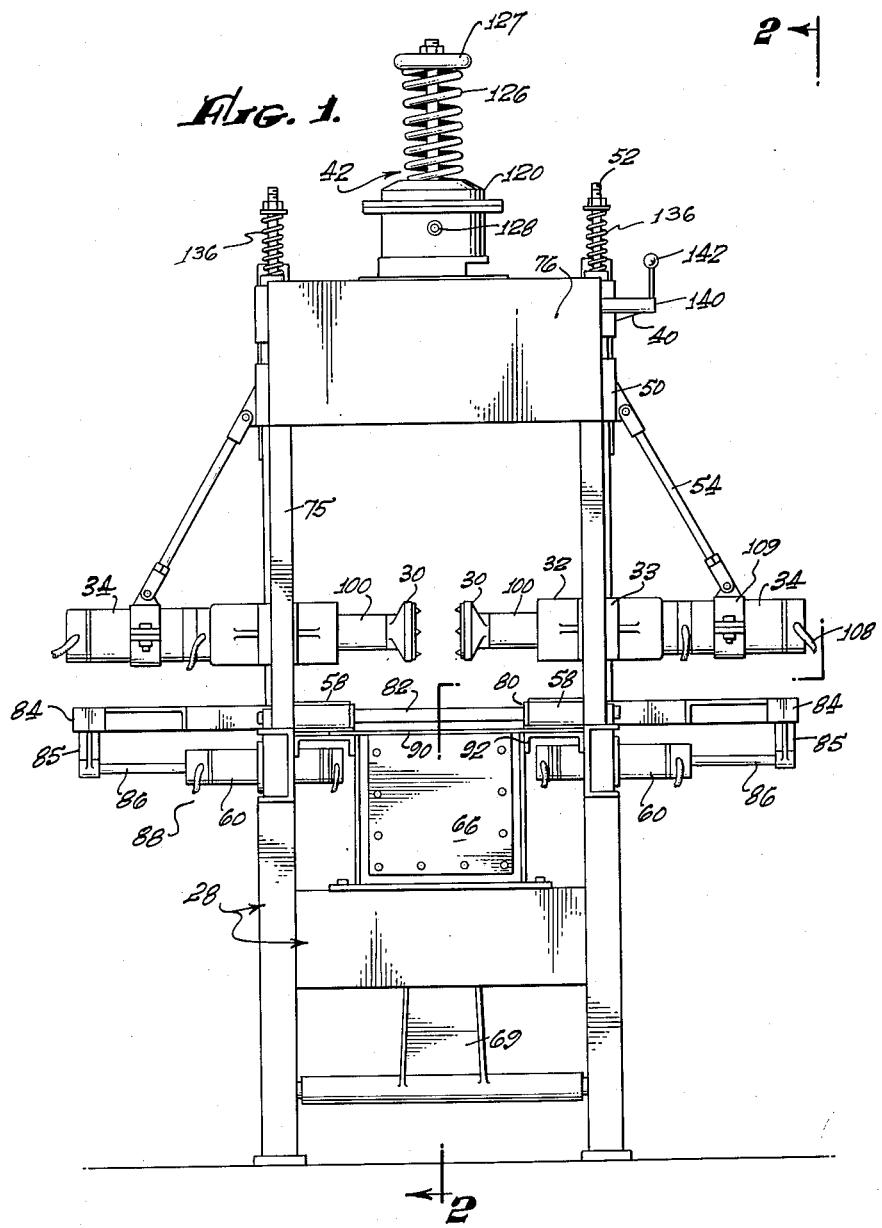
Fig. 1 is a rear elevation of apparatus embodying the present invention, gripping jaws for battery casings being shown in casing gripping position.

Fig. 4 is largely a side elevation, near portions being broken away, on a smaller scale than that of Figs. 1, 2 and 3, showing the apparatus of Figs. 1, 2 and 3 in operative relationship with battery-conditioning apparatus, including an oven, from which batteries whose sealing composition has been softened, are supplied to the present wrecking apparatus seen at the left of the figure, an inverted battery casing being shown in position between the gripping jaws, the plate assembly of the battery cells having been shaken loose and dropped into a receiver from which they will be discharged;

Fig. 5 is principally a fragmentary plan view as indicated by the line 5—5 of Fig. 4, and showing the position of the inverted battery casing;

Figs. 6, 7 and 8 are respectively views indicating successive positions of a battery supplied to position between the gripping jaws and up to the battery inverting position;

Figs. 6A, 7A and 8A are principally plan views taken on the lines 6A—6A, 7A—7A and 8A—8A of Figs. 6, 7 and 8 showing the respective positions of a battery as it is being gripped while on supports, when the supports are withdrawn from below the battery, and when the battery is inverted to substantially the same position as that of Fig. 5;

Fig. 9 is a vertical section taken approximately on a portion of the line 9—9 of Fig. 2 and showing control mechanism used behind the apparatus;

Fig. 10 is a vertical section taken on the line 10—10 of Fig. 9;

Fig. 11 is a vertical section through the vibrating mechanism and taken on the line 11—11 of Fig. 3;

Fig. 12 is a horizontal section taken through one of the battery-gripping devices and its actuating mechanism, as indicated by the line 12—12 of Fig. 3;

Fig. 13 is a fragmentary section on an enlarged scale taken on the line 13—13 of Fig. 12; and Fig. 14 is a diagrammatic showing of the control system for the whole apparatus, including the control mechanism of Fig. 9.

Principally the present battery-dismantling apparatus includes a preliminary heater or oven 20 shown in Fig. 4 through which a succession of loaded battery cases B is passed on an endless conveyor 21 mounted upon appropriate rollers 22 or the like carried at the tops of supporting standards 23, such conveyor 21 moving in the direction of the arrow 24. The oven 20 melts the conventional sealing material provided in the top of each battery casing to enclose the various cells and seal off the conventional exposed lead terminals B'. The heated batteries B are discharged onto a receiving bed 25 carried on front rails 26 of a main framework 28. The conveyor 21, upon which the batteries B are originally set in suitably spaced relationship, acts to push hot batteries along the bed 25 for presentation between a pair of opposed rotary gripping jaws 30 constituting a vise. These jaws 30 are mounted in horizontally disposed housings 32 having at their outer ends pneumatic cylinders 34 for movement of the jaws 30 axially between their non-gripping position of Fig. 1 and their gripping position of Fig. 1. Each jaw-supporting housing 32 has lateral housing extensions 33 which are mounted for vertical vibratory or shaking action upon vertically disposed supporting and positioning rods 35 fixed at their lower ends in longitudinal rails 36 of the previously mentioned framework 28. The upper ends of the positioning rods 35 are positioned by means of a rectangular platform or cross head 38 through the medium of elongated hubs 40 fixed on such rods. Mounted on the top of the rectangular platform or cross head 38 is a pneumatic shaker or vibrator 42 having depending therefrom a vertically reciprocating vibration-transmitting actuating rod 44 (Fig. 11) whose lower end passes through a hub 45 in the cross head 38 and is fixed to a center hub 46 of a vibrating cross head 48 slidably mounted by means of hubs 50 on the upstanding positioning rods 35. The opposite ends of the vibrating cross head 48 are secured by means of tie or connecting rods 52 (Fig. 2) to the housing extensions 33 of the housings 32 carrying the rotary gripping jaws 30. Brace rods 54 (Figs. 1 and 3) connect the ends of the reciprocating cross head 48 to the pneumatic cylinders 34 on the housings 32.

Thus, actuation of the vibrator 42 through control mechanism 55 (Figs. 2 and 9), presently to be described, serves to reciprocate in vibratory fashion the whole unit including the two rotary gripping jaws 30, their housings 32, the pneumatic cylinders 34 and the vibratory cross head 48.

Heated batteries B from the oven 20 are passed into position on a two-part table formed by separable roller conveyor units 58 (Figs. 3, 5 and 6A) between the rotary vise jaws 30 which are then actuated by the pneumatic cylinders 34 to move them from the position of Fig. 3 to the position of Fig. 1. When the battery is gripped between the jaws 30 in the position of Figs. 1 and 6A, pneumatic cylinders 60 are actuated from the control mechanism 55 to separate the table roller units 58 to the position of Figs. 5 and 7A. The jaws 30 are then simultaneously rotated through action of the control mechanism 55 by gear means 62 (Figs. 2 and 12) to move the battery B from upright position as in Fig. 7A to inverted position as in Figs. 5 and 8A. Rotation of the gear means 62 is effected through the medium of chains 63 and pneumatic cylinders 64 carried in the upper or fixed cross head or platform 38. The control mechanism 55 is next operated for actuation of the shaker or vibrator 42 until the battery contents, indicated at C in Fig. 4, including the softened sealing composition, the sulfuric acid, the lead grids, and the separators are shaken loose so that they drop into a receiver 65 whence they may be discharged by a pusher 66 into a chute 67 leading to a suitable repository from which the acid may be drained off and the solids recovered. The pusher 66 is actuated by a pneumatic cylinder 68 and appropriate connecting linkage 69 (Figs. 2 and 4) carried by lower portions of the framework 28.

Details of construction

The battery-receiving bed 25 indicated in Fig. 4 by broken lines may in fact be a stationary roller conveyor having a series of rollers 70 mounted in slide rails 72 as seen in Fig. 2, which are arranged to present heated batteries B to the separable roller conveyor units 58 (Figs. 5 to 8A) which in turn discharge dismantled battery cases to a stationary roller conveyor 74 at the back of the machine (Fig. 2). Located at any convenient point at the sides of the discharge conveyor 74 the framework 28 is provided with upstanding standards 75 provided at their tops with a cross housing 76 which encloses the previously mentioned control mechanism 55 in position directly behind the cross heads 38 and 48 carried on the upstanding rods 35.

Each of the separable table units 58, in the form shown, includes a pair of side rails 80 in which the rollers 58 are journalled and which constitute frames whose ends are slidable transversely on supporting cross rods 82 (Figs. 1, 2 and 3) which define between them, and between the units 58 when separated as in Figs. 5 and 8A, a battery-shaking zone. For the purpose of separation of the roller units 58 by movement from their closed positions of Figs. 3 and 6A, such roller units 58 are connected with their respective pneumatic cylinders 60 by appropriate brackets 84 slidable in adjacent portions of the framework 28 and having depending arms 85 connected to piston rods 86 which actuate conventional pistons (not shown) carried in the pneumatic cylinders 60. The two cylinders 60 are connected with the same air supply lines 88 (Fig. 14) so that they are simultaneously moved inward to close the table roller units 58 and simultaneously moved outward to separate the rollers units 58. The pusher 66 is reciprocated in unison with the movement of the roller units 58, and this is accomplished by connecting the pneumatic cylinder 68 for the pusher 66 and its linkage 69 with the air supply lines 88 supplying the pneumatic cylinders 60, all of which are thus under the influence of the control mechanism 55. Desirably, the pusher 66 in the receiver 65 is connected at its top with a reciprocating plate 90 (Figs. 1, 2 and 3) whose side edges slide between appropriate guide means 92 (Fig. 2) suitably connected with the framework 28. With the described arrangement, when the roller units 58 are in the closed position of Figs. 2 and 3, and the pusher 66 is in its discharging position, the plate 90 underlies the roller units 58. When the cylinders 60 are energized to separate the roller units 58, the pusher cylinder 68 is simultaneously energized to withdraw the underlying plate 90 and the pusher 66 so that the plate 90 is moved to the right as viewed in Fig. 2 to underlie the stationary feed roller conveyor 70, thus freeing the receiver 65 for dropping thereinto the battery contents C shown in Fig. 4. For such actuation the pusher 66, which is shown in the form of a plate, is provided with rearwardly extending gussets 94 to which an upper arm 95 of the linkage 69 is pivoted, a lower linkage arm 69a being fulcrumed at 96 in the framework 28 with its middle portion pivoted to a piston rod 97 of the piston carried in the cylinder 68. The upper edges of the gussets 94 may be fixed to the under side of the reciprocating plate 90 as by means of angle irons 94a (Fig. 3).

When a heated battery B is being pushed into dismantling position, the roller units 58 are in their closed position of Fig. 3 and 6A, and the pusher 66 is in its discharging position of Figs. 2 and 6, and the gripping jaws 30 are in their open position of Fig. 3. The battery B having been positioned between the open jaws 30, manipulation of the control 55 energizes the pneumatic cylinders 34 to move the jaws 30 into position to grip the positioned battery B (as in Fig. 6A) whereupon the cylinders 60 and 68 are energized from the air lines 88 through the agency of the control means 55 to separate the roller units 58 and withdraw the plate 90 carried by the pusher 66, whereby to clear the space below the battery. The jaws 30 are then rotated to invert the battery B to assume the position of Figs. 4 and 8A, this being accomplished through the previously mentioned gear 62 for each jaw 30. Each jaw 30, which is preferably rectangular as indicated so as to engage a substantial area of the respective side wall of the battery case, is carried on the outer end of a hollow shaft 100 (Fig. 12) splined for axial reciprocation in a sleeve element 101 upon which is fixed the previously mentioned gear 62, this assembly being journalled in an appropriate bearing 102 within the housing 32 which is carried on the upright mounting rods 35 through the medium of hub-like ends of the housing extension 33.

As shown, the pneumatic cylinder 34 for each gripping jaw 30 is bolted at 103 to the outer end of the housing 32 so that a piston rod 104 of an actuating piston 105 within the cylinder 34 aligns with an opening 106 in the housing 32, whereby the end of the rod 104 projecting into the hollow shaft 100 may be bolted in the latter as illustrated in Fig. 12. With this construction each jaw 30 and its hollow shaft 100 are easily rotated in the housing 32 through the medium of the gear 62, and the hollow shaft 100, together with its jaw 30, is projected to or retracted from battery-engaging position through the medium of pneumatic pressure working on the piston 105 and applied by respective branches of air lines 108. As previously indicated, each pneumatic cylinder 34 is braced against the reciprocating cross head 48 by means of the brace rod 54, the lower end of each rod being joined as by a pivot pin to a clamp sleeve 109 around the respective cylinder 34.

When the cylinders 34 are actuated to advance the gripping jaws 30 into a battery-engaging position, engagement of each jaw 30 with a battery side wall is effected through the medium of both a rubber gripping pad 110 carried in a cup-shaped casting which constitutes the jaw proper, and through the medium of a series of spurs 112 which project through and a short distance beyond the rubber pad 110 to penetrate the slightly yielding composition of the battery case. Optimum gripping conditions may be obtained by forming the spurs 112 as the sharpened inner ends of screws 113 which are adjustably threaded into hubs 114 at the back of the respective jaw 30. As has been previously described, rotation of the jaws 30 through the medium of the gears 62 is effected by chains 63 passing around the sprockets or gears 62 and actuated from the vertical pneumatic cylinders 64. Such actuation is effected through attachment of the ends of the chains 63 to the projecting ends of piston rods 115 connected with operating pistons 116 (Fig. 14) in the vertical cylinders 64 carried by the fixed cross head 38. Energization of the cylinders 64 to rotate the gripping jaws 30 is effected through appropriate air lines 118 and branches thereof, as best seen in Fig. 14, and under the influence of the control mechanism 55.

A heated battery B having been gripped between the gripping jaws 30 through action of the pneumatic cylinders 34 and their pistons 105, and the battery having been inverted by rotation of the jaws 30 through the respective gears 62 and the pneumatic pistons 64, the battery is now severely shaken by vibratory reciprocation in a vertical path, along with the supporting unit including the housings 32, the cylinders 34 and the cross head 48, through the medium of the vibrator 42 whose structural detail is shown in Fig. 11. Here the vibrator 42 is shown as including a vibrator housing 120 containing a piston 122 with which the vibrating piston rod 44 previously described is connected for actuation of the cross head 48. The housing 120 constitutes an airtight cylinder for the piston 122 to which cylinder air under pressure is transmitted as through a port or ports 124 at one or both sides and from which it may be exhausted by way of a port 125 at another side. Above the cylinder housing 120, through which the upper end of the piston rod 44 extends, there is a heavy vibrator spring 126 bearing at its lower end on the top of the housing 120 and at its upper end under a cap 127 secured to the top of the piston rod 44.

For actuation of the pneumatic vibrator 42 air under pressure is supplied to the cylinder housing 120 through a line 128 under the influence of the mentioned control mechanism 55 at the will of an operator. When the spring 126 holds the piston 122 in the elevated position of Fig. 11, pressured air from the line 128 enters the cylinder through the port (or ports) 124 thus forcing the piston 122 to a lower position where its exhaust port 125 registers with an exhaust line 130, whereupon exhaustion of pressure in the cylinder 120 permits the spring 126 to snap the piston back up to the elevated position shown where the inlet port (or ports) 124 again registers with the pressure line 128 to repeat the operation. The result is a very rapid reciprocating motion of vibratory character having an amplitude equal to the reciprocatory path of the pistons 116 in the vertical cylinders 64. With a battery B in the position of Figs. 5 and 8A, whose sealing material at the top thereof has been reasonably well softened in the previously mentioned oven 20 of Fig. 4, the contents of the battery are quickly dislodged, the described vibratory action, assisted by the influence of gravity, resulting in very prompt dislodgment of the battery contents C from the battery into the receiver 65 as in Fig. 4.

The operator thereupon shifts the control mechanism 55, as presently to be described, to cut off air pressure to the vibrator line 128, to energize the pusher cylinder 68 and the cylinders 60 for the roller units 58, and to actuate the gripping jaw cylinders 34 to withdraw the latter for releasing the battery case so that it may be pushed from the roller units 58 to the discharging roller conveyor 74 (Fig. 2) by a newly advancing hot battery B. When the unloaded battery case BB shown at the left of Fig. 4 reaches its illustrated position, being still inverted, it is preferably washed with a water spray indicated by two arrows so that lead mud remaining in the bottom of the case is preferably washed out and drops into a mud receptacle 135. Such mud may be combined with the battery contents C recovered from the receiver 65 and sent to a melting-down plant or smelter for recovery.

When a battery is being shaken in inverted position by the shaker 42, return of the battery-carrying portions of the mechanism to an elevated position by the heavy spring 126 may be assisted by four auxiliary springs 136 carried between the fixed cross head 38 and the upper ends of the tie rods 52 (Fig. 2), and counterbalancing the dead weights.

*Control mechanism*

The previously mentioned control mechanism 55 carried in the control housing 76 at the top of the rearward standards 75, or in any other convenient location, may be such as shown in Figs. 9 and 10 and diagrammatically indicated in Fig. 14. This mechanism includes a horizontal shaft 140 which extends through an end wall of the housing 76 into a position convenient to an operator where it is provided with a handle 142, somewhat as seen in Fig. 1, and capable of rocking the shaft 140 through 180°. Instead of employing the elongated transverse housing 76 as the housing for mounting the parts seen in Figs. 9 and 10, a supplemental housing 143 may be used which includes one end wall 144 through which the handle-carrying end of the shaft 140 projects and in which it is borne, another end wall 145 journalling the opposite end of the shaft 140 and being provided with a stop pin 146 co-operating with a stop plate 148 fixed on the adjacent end of the shaft 140. As seen at the left of Fig. 14, the stop plate 148 is provided with stop shoulders 150 to limit the rocking of the shaft 140 back and forth through an arc of 180°. In addition to the stop plate 148 the shaft 140 also carries a series of cams I, II, IV and III, shown in the indicated order in Figs. 9 and 14. The cam I controls air flow through the lines 108 to the cylinders 34 for actuating the vise jaws 30. The cam II controls air flow through the lines 88 to the cylinders 60 for actuating the table roller units 58 and to the cylinder 68 for actuating the pusher 66. The cam III controls air flow through the lines 118 to actuate the turnover or battery-inverting cylinders 64 for rotating the vise jaws 30 to invert the battery. The cam IV controls air flow through the single line 128 to the vibrating pneumatic battery shaker 42. The dwells of the cams I, II, III and IV are arranged approximately 45° apart so that their leading edges are advanced successively through the indicated 180° by the handle 142 from the indicated off position in Fig. 14 successively to the other four positions indicated. At the end of a cycle the handle 142 is returned through the indicated 180° to the off position, and as a result the cams I, II and IV are returned to their original positions. The cam III, however, remains in the advanced position, and only a ratchet wheel 152 returns. This ratchet wheel 152 has spring-pressed ratchets 153 under tension of springs 154 for engagement with teeth 155 of the cam III. The reason for not returning the cam III, which inverts the batteries, is that normally a battery case is not returned to upright position after dismantling but is discharged in its inverted position for washing. Thus, when the next battery B is brought into position, the vise jaws 30 are against rotated 180° from the shaft 140 by operation of the ratchet wheel 152 working upon the cam III. As presently to be described, if, for any reason, a battery must be inverted before discharge, as in the case of a cull which was not fully dismantled, means may be provided for such immediate reversion. In any event a battery cases is always rotated through 180° upon any operation of the cam III by 180° rotation of the ratchet wheel 152 under the influence of the handle 142.

Each of the cams I, II, III and IV is arranged for its dwell to depress a pivoted arm 160 which when depressed moved a switch plunger 162 in an electric switch box 164. The switch in the respective switch box controls the flow of electric current through electric wiring, as illustrated, to a solenoid which operates a conventional slide or piston valve (not shown) in the respective valve box 165. A source of air pressure is connected to an air feed line 170 leading by branch lines to each of the four valve boxes 165 and an exhaust line 172 leads off exhaust air therefrom except in the case of that valve box under the control of the shaking cam which supplies air to the vibratory shaker 42.

In order for emergency operation to be permitted, an appropriate switch 175 is provided in the main line and an appropriate switch 176 is provided in the lines controlled by the cam I to operate the vise jaws independently when necessary. Similarly a toggle switch 178 is provided in the circuit for the turnover cam III for independent operation of the cam III when required to advance the turnover gears 62 through 180° independently of the normal to-and-fro operation of the handle 142. This toggle switch 178 need not be returned to an initial position because it is a matter of indifference whether the vise jaws and the battery are rotated in one direction or the other or in unison with 180° handle movements.

*Operation*

When the heated battery is moved by the conveyor 21 from the oven 20, to the stationary roller conveyor 70 and thence to the retractable roller table units 58, it passes between the gripping jaws or vise jaws 30 which are in their open positions as illustrated in Fig. 3. The operator then moves the handle 142 of the control mechanism 55 to rotate the shaft 140 and the cams I, II, III and IV from the off position shown in Fig. 14 to the next position to energize the cylinders 34 so that they close the vise jaws 30. Such action of the cylinders 34 is produced by the dwell of the cam I depressing the respective switch arm 160 to actuate the respective air valve 165 for supplying air pressure through the lines 108 to the cylinders 34. Since the dwell in this cam is about 180°, the cylinders 34 will remain energized throughout the excursion of the handle 142 from off position to shaking position and return. The vise jaws 30 having been made to grip a battery B, as in Fig. 6A, the handle 142 is rocked to the second position of Fig. 14 whereupon the dwell of the cam II operates its switch 164 and air valve 165 to energize simultaneously the cylinders 60 which withdraw the table roller units 58 and the cylinder 68 which retracts the pusher 66 from the position of Fig. 2 to the position of Figs. 4 and 7. The operator then advances the handle 142 and the shaft 140 to bring in the dwell of the turnover cam III to actuate its switch 164 and air valve 165 to operate the pistons 64 and roll the jaws 30 through their gears 62 from the battery position of Figs. 7 and 7A to the inverted battery position of Figs. 4, 8 and 8A, whereupon acid begins to drain out of the battery. During this inverval the dwells of the cams I and II have maintained the air pressure conditions in the cylinders 34, 60 and 68.

The inverted battery, thus held between the jaws 30 is now ready to be shaken and its contents discharged. For this purpose the operator moves the control handle 142 to the down position of Fig. 14 which brings the dwell of cam IV around to depress the respective switch arm 160 which produces actuation of the respective switch 164 and air valve 165 to energize the shaking piston 122 of the shaking vibrator 42, as best indicated in Fig. 11. The handle 142 is maintained in shaker-operating position until the battery contents have been shaken loose, with the assistance of gravity, and dropped into the receiver 65 as in Fig. 4. During this interval the dwells of the cams I, II, and III have maintained the pressure conditions in the cylinders 34, 60, 68 and 64.

The battery contents having been discharged, the handle 142 is returned to the off position of Fig. 14, the cams I, II and IV being returned by the shaft 140 to their initial positions and the stop plate 148 striking the stop pin 146 to limit the return movement. However, since it is not ordinarily desired to reverse the battery B, the previously described ratchet plate 152 is the only part of the turnover control that returns to initial position, the cam III itself remaining in its previously advanced position, ready to be advanced through another 180° for shaking the next battery. On the next movement of the cam III, the respective air valve 165 will be returned so that the cylinders 64 work in the opposite direction to rotate the jaws through another 180°, but in reverse rotation.

It will be apparent that as the handle 142 is returned from shaking position to off position, the cams I, II and IV successively travel back to their initial positions so that shaking is discontinued, then the separable table roller units 58 are returned into position under the empty battery case, and the vise jaws 30 are withdrawn from battery-engaging position. The cylinders 64 of course remain in whatever position they may have been placed by the advancing operation of the cam III, and this condition will maintain until the respective electric switch 164 is again actuated through advancing movement of the handle and of the cam III through the ratchet wheel 152 to reverse the operation of the cylinders 64.

Thus, a battery-wrecking or dismantling cycle is produced by the movement of the handle 142 from the off position successively through the various stages indicated in Fig. 14 to the shaking position and thence back to the off position, whereupon the emptied battery case BB is moved off the table roller units 58 onto the discharge roller conveyor 74 to the spraying and mud-dislodging position seen at the left of Fig. 4, whence the emptied battery BB is discharged as desired.

The invention claimed is:

1. Apparatus for dismantling electric storage batteries, including: framework; retractable battery-supporting means in said framework; vise jaws adjacent opposite sides of said retractable means; power means for moving said jaws between gripping and non-gripping positions with respect to opposite sides of a battery on said supporting means; power means for retracting said supporting means; power means for rotating said jaws to invert a battery held therebetween; vertically reciprocating means movable in said framework and carrying said jaws, the power means for moving said jaws to and from gripping position and the power means for rotating said jaws; and power means on said framework connected with said reciprocating means for reciprocating the latter and the jaws and power means carried thereby while carrying a battery.

2. Apparatus as in claim 1 having control means including plural control elements connected to the respective power means to actuate such power means in sequence.

3. Apparatus as in claim 1 including a discharge device beneath said retractable support and power means connected for operation of said discharge device simultaneously with said retractable support.

4. Apparatus as in claim 1 wherein the power means for said reciprocating means is a pneumatic vibrator at the top of said framework.

5. Apparatus as in claim 2 in which the sequential connection of the plural elements provides for initial actuation of the power means for the vise jaws, then actuation of the power means for retracting said battery supporting means, then actuation of the power means for rotating the jaws and inverting the battery, and then energization of the power means for the reciprocating means to shake the battery.

6. Apparatus as in claim 5 wherein the plural control elements are cam operated by a common shaft and actuating switches successively operated by said cams.

7. Apparatus as in claim 6 wherein said power means are pneumatic cylinders and pistons, and air valves are included in air lines to said cylinders and are controlled in turn by said switches.

8. Apparatus as in claim 6 wherein the cam for controlling rotation of said jaws has a ratchet wheel drive returnable to original position with the other cams, such rotation-controlling cam remaining always in its advanced position.

9. In battery dismantling apparatus: a framework; upright guide means on said framework; a reciprocatory structure slidable vertically on said guide means; opposed gripping jaw means; horizontal jaw-carrying means carrying said jaw means and rotatably mounted on said slidable structure; power means mounted on said jaw-carrying means to move said jaw means horizontally between gripping and non-gripping positions; means to rotate said jaw-carrying means about its axis and invert a battery between said jaw means; and vibrator means connected with said reciprocatory structure to vibrate the latter vertically with its jaw means and jaw-carrying means.

10. Apparatus as in claim 9 including retractable table means underlying the position of said jaw means, and means to retract said table means to free a space below said jaw means.

11. Apparatus as in claim 9 including: first fluid cylinder and piston means constituting said jaw-rotating means; second fluid cylinder and piston means constituting said power means to move said jaw means; and pneumatic means actuating said vibrator means.

12. Apparatus as in claim 11 including retractable table means underlying the position of said jaw means to present a battery to such jaw means, and fluid cylinder and piston means to retract said table means.

13. Apparatus as in claim 12 including a single control unit having a series of actuating members arranged on a common actuator for successively energizing said fluid power means for moving said jaw means, said fluid means for retracting said table means, said fluid means for rotating said jaw means, and said pneumatic means for actuating said vibrator means, upon a single excursion of said common actuator.

14. In battery wrecking apparatus: means for supporting electric storage batteries advancing thereon in upright position; battery gripping means disposed adjacent opposite sides of such supporting means, said gripping means including opposed vise jaws and horizontally movable means connected therewith for moving them toward and away from each other for gripping a battery between them and releasing such battery; upstanding means carrying said battery gripping means; vertically reciprocable means mounted on said upstanding carry means, such reciprocable means in turn carrying said gripping means in reciprocable position; means also carried by said vertically reciprocable means and connected with said gripping means for rotating the latter to invert a battery gripped thereby; means for reciprocating said reciprocable means for vertically vibrating an inverted battery and shaking the contents of the battery from its case, the supporting means being movable from battery supporting position to provide for dropping battery contents from an inverted battery upon shaking thereof; and plural means arranged to act in sequence to actuate said vise jaws to gripping position, to move said supporting means from battery-supporting position, to rotate said jaws to battery-inversion position, and to energize said reciprocating means to shake the inverted battery.

15. Apparatus as in claim 14 including means for softening sealing material at the top of the battery to facilitate discharge of battery contents upon inversion and shaking.

References Cited in the file of this patent

UNITED STATES PATENTS

| | | |
|---|---|---|
| 1,290,675 | Stebler et al. | Jan. 7, 1919 |
| 1,632,110 | Beugher | June 14, 1927 |
| 2,119,857 | Eppensteiner | June 7, 1938 |
| 2,293,192 | Campbell | Aug. 18, 1942 |
| 2,380,329 | Price | July 10, 1945 |
| 2,525,572 | Woody et al. | Oct. 10, 1950 |
| 2,652,140 | Hall | Sept. 15, 1953 |
| 2,741,815 | Young | Apr. 17, 1956 |